July 13, 1937.   W. A. GWYNN   2,086,866
VULCANIZING DEVICE
Filed June 28, 1935   3 Sheets-Sheet 1

Inventor
William A. Gwynn
By Cushman, Darby & Cushman
Attorneys

July 13, 1937. W. A. GWYNN 2,086,866
VULCANIZING DEVICE
Filed June 28, 1935 3 Sheets-Sheet 2

Inventor
William A. Gwynn

July 13, 1937.  W. A. GWYNN  2,086,866
VULCANIZING DEVICE
Filed June 28, 1935  3 Sheets-Sheet 3
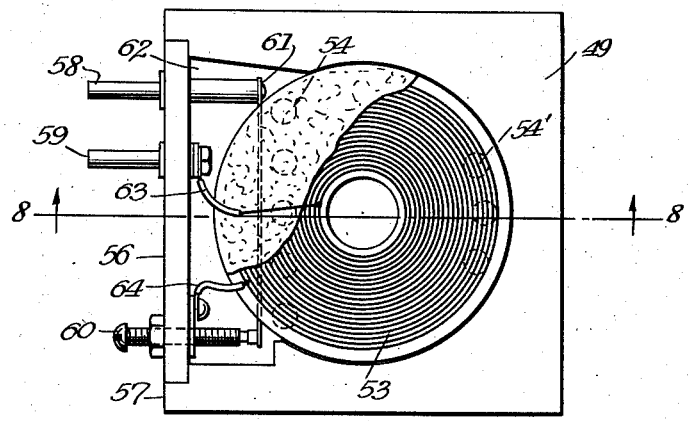
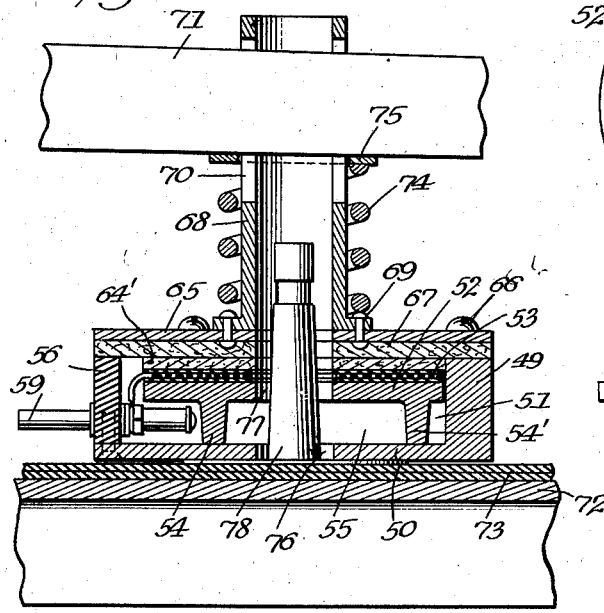
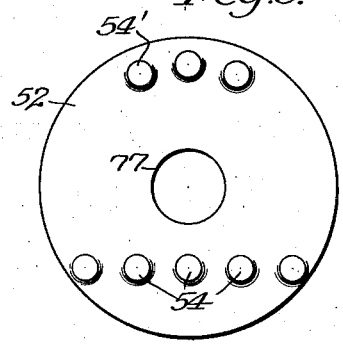
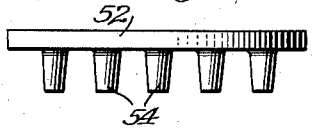
Inventor
William H. Gwynn
By Cushman, Darby & Cushman
Attorneys Patented July 13, 1937

2,086,866

UNITED STATES PATENT OFFICE 2,086,866

VULCANIZING DEVICE

William A. Gwynn, St. Louis, Mo.

Application June 28, 1935, Serial No. 28,929

10 Claims. (Cl. 18—18)

The present invention relates to vulcanizers and more particularly to an apparatus for vulcanizing valve stems to the inner tubes of tires, but which may be used with equal efficiency in the vulcanization of tires, tubes and other rubber articles.

An important object of the invention is to provide a simple, efficient and economical vulcanizing device which will insure the proper degree of heat being applied to the vulcanizing area, and in which means are provided for localizing the heat so that when the device is used to vulcanize a rubber valve stem to an inner tube, the outer end portion of the stem will not be subjected to an excessive or injurious degree of heat.

A further object of the invention consists in providing in a unitary structure a combined movable pressure member and heating unit having a vulcanizing surface arranged to coact with a relatively stationary base so as to secure firmly the work between the base and the pressure member to prevent distortion of the work during the vulcanizing operation.

Another object of the invention consists in means for connecting the movable heated surface member to its support to provide a floating connection for the said member and thus allow it to be adjustable substantially longitudinally of the base so that the vulcanizer may be used to cure tubes and valve stems of varying sizes, shapes and thickness. Additionally, by means of the adjustment of the heated surface member the same may be moved to vulcanize the work without the necessity of first positioning the part to be cured in a predetermined position relative to the heated surface member.

A further object comprehends the provision of means for connecting the heated surface member to an operating member in such a manner as to permit either simultaneous movement or independent movement of these members relative to each other, thus insuring a uniform application of pressure and also providing means which automatically compensates for irregularities in the thickness of the work.

A further object consists in providing a heated block with means for insuring the rapid and uniform transmission of the heat generated by an electric heating element to the vulcanizing surface and the thermostat through a heated air chamber and positioning the thermostat so that it is readily responsive to variations in temperature of the vulcanizing surface to control accurately the flow of current to the heating element.

Other objects and advantages of the invention will become apparent from the following description when taken in conjunction with the accompanying claims.

Referring to the drawings in which is disclosed a preferred embodiment of my invention, Figure 1 is a plan view of a vulcanizing device constructed in accordance with my invention;

Figure 7 is a plan view of a modified form of the heated block with parts broken away for clearness of illustration;

Figure 8 is a sectional view taken substantially along the line 8—8 of Figure 7;

Figure 9 is a plan of the heat conducting plate associated with the block shown in Figure 7; and Figure 10 is a side elevation of Figure 9.

Figure 1:
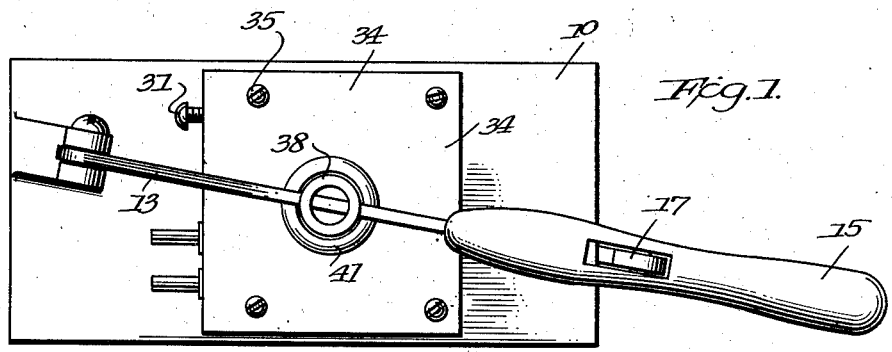

Referring to the drawings in which like numerals indicate like parts, 10 designates a metallic base which, as shown, is of elongated shape, but which may be of any suitable configuration and size, and has legs 11 for supporting it on a table, bench or the like.

Extending upwardly from the base 10 adjacent one end thereof and preferably off-set to this end, is a standard 12 to which is pivotally connected an operating member 13 as at 14. The operating member 13 terminates at its free end in a handle 15 and has pivotally connected thereto, as at 16, a depending arm 17 provided on one side with a series of teeth 18 arranged to selectively engage a flanged portion 19 of the base 10 (Figure 2) so as to releasably maintain the operating member 13 and its associated parts in a fixed position relative to the base 10.

Figure 4:
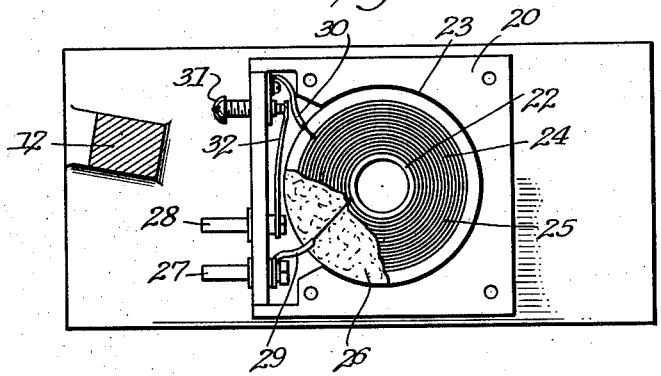
Figure 4 is a plan view of the vulcanizer, with the cover plate removed and parts cut away to show the heating unit and its associated parts.

A movable member or block 20 is provided on its underside with a smooth vulcanizing surface 21 and has extending therethrough a medially disposed opening 22. Additionally, the member 20 is formed with an annular recess 23 which surrounds the opening 22. Positioned within the recess 23 is an electrical heating unit 24 of any suitable construction and which may comprise a flat coil of insulated wire 25 enclosed between sheets of mica 26. A pair of contact posts or terminals 27 and 28 extend from one side of the vulcanizing member 10, preferably adjacent the standard 12 so as to be disposed in an out of the way position. One end of the coil 25 is connected by a conductor 29 (Figure 4) to the terminal or contact post 27, while the other end of the coil is connected by a conductor 30 to an adjustable contact screw 31. A thermostatic bar 32 secured at one end to the contact post 28 has its other end bearing against the end of the screw 31. The thermostat controls the heat conducted to the heating unit 24 so that when the temperature of the heat exceeds a predetermined degree, the bar 32 will break contact with the screw 31, and thus shut off the current to the heating coils 25 to prevent excessive burning of the rubber.

The heating unit and thermostatic control device as shown are substantially similar to the corresponding parts disclosed in my copending application now Patent No. 2,009,549, dated July 30, 1935, but obviously various other means may be utilized for applying and controlling the heat to a localized area of a vulcanizing member.

One or more layers of heat insulating material such as asbestos discs 33 fit within the recess 23 so as to lie against the upper side of the heating unit. The discs 33 have central openings which register with the opening 22 to permit a valve stem or retaining member to extend freely therethrough. A cover or retaining plate 34 removably secured to the top of the vulcanizing member by the screws 35 maintains the heating unit and discs in a substantially fixed position within the recess 23. A layer of asbestos 36 may be interposed between the cover 34 and the top of the member 20 to provide additional means for insuring the maximum degree of heat being conducted to the vulcanizing surface and to prevent the heating of the cover 34.

The plate 34 has a centrally disposed opening 37 which registers with the opening 22. Extending upwardly from the plate 34 in alignment with the opening 37 is a tubular stem or arm 38 secured to the plate 34 by the bolts or rivets 39. The stem 38 is provided with an axially disposed elongated closed opening or aligned slots 40 through which loosely extends the operating member 13 to permit longitudinal movement of the stem 38 and its associated parts relative to the operating member 13 and thus provide a "floating" connection for the vulcanizing member and the heating unit. A coil spring 41 surrounds the stem 38 and is confined between the plate 34 and the underside of the operating member 13 to constitute a yieldable support for the latter.

The heating unit 24 is associated with the block 20 so that these parts constitute a movable unitary structure in which the vulcanizing surface 21 is arranged to coact with the upper surface of the base 10 to firmly clamp or maintain the work in position during the vulcanizing operation. Additionally, by reason of the floating connection of the stem 38 relative to the operating member 13 the vulcanizing surface 21 may be moved longitudinally or lengthwise of the base 10 to permit its efficient use with tubes of different sizes and thicknesses and may also readily align itself with the part of the work on the base 10 to be cured.

The elongated slots 40 are of sufficient length to permit a slight clearance being formed between the operating member 13 and the spring 41 to allow an initial tilting of the member 20 so that the latter may accommodate itself to any irregularities in the surface of the work. The length of each of the slots 40 is such as to preclude the operating member 13 in its downward movement from contacting with the valve stem when the device is used for vulcanizing the base of the valve stem to a tube.

Figure 2:
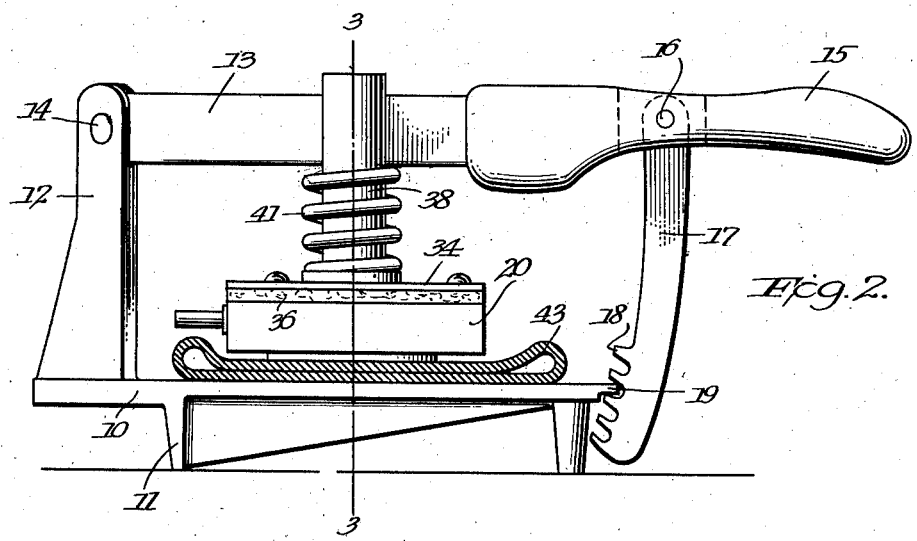
Figure 2 is a side elevation of Figure 1.
Figure 3:
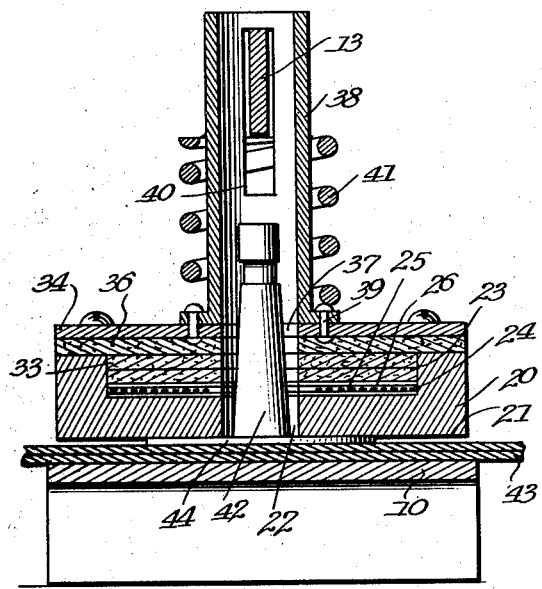
Figure 3 is an enlarged sectional view taken substantially on the line 3—3 of Figure 2.

In operation, assuming that it is desired to vulcanize a rubber valve stem 42 (Figure 3) to the inner tube 43, the tube is first positioned on the base 11. The valve stem 42 which previously has the underside of its base 44 coated with vulcanizing material, is then inserted in the opening 22 so that the base of the stem will engage the tube at the point where the stem is to be connected, after which the operating member 13 is moved downwardly against the tension of the spring 41 so as to force the tiltable vulcanizing surface 21 into uniform engagement with the tube 43 and likewise the base 44 of the valve stem into firm contact with the tube. The parts are retained in this position by moving the teeth 18 of the arm 17 into engagement with the flange 19 (Figure 2). It will be understood, of course, that at the point where the valve stem is applied to the tube, an opening is made in the latter so as to register with the opening in the valve stem.

Figure 5:
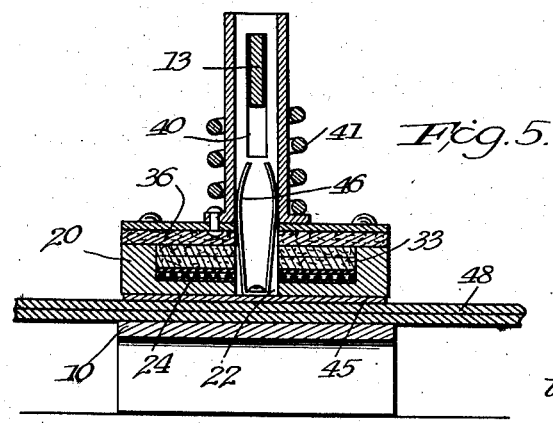
Figure 5 is a view similar to Figure 3 but showing an auxiliary heating plate inserted in the opening of the vulcanizing member so as to illustrate the use of the device for repairing tubes and other rubber articles.
Figure 6:
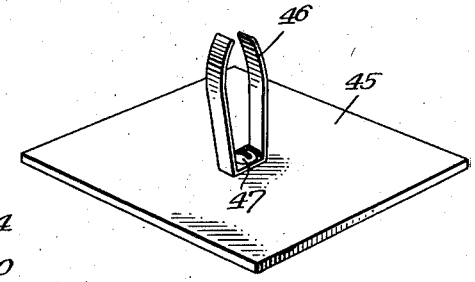
Figure 6 is an enlarged perspective view of the auxiliary plate shown in Figure 5.

When the device is utilized for patching tubes or curing other rubber articles, an auxiliary plate 45 (Figure 5) is arranged to provide a smooth and continuous vulcanizing surface and is detachably secured to the underside of the movable member 20 by the spring fingers 46 secured to the plate 45 by the screw 47 (Figure 6). The fingers 46 extend upwardly into the opening 22 in the block 20 to engage yieldably the wall of the opening and thus detachably secure the plate 45 to the block 20.

It will be seen that the auxiliary plate 45 coacts with the base 10 to maintain firmly the work 48 in a fixed position during the curing or welding operation and may readily be removed to utilize the device for permanently securing a valve stem to an inner tube.

By reason of the novel arrangement of parts, simple, efficient and compact means are provided when the vulcanizer is used to connect a valve stem to an inner tube to prevent the transfer of heat to the outer end portion of the stem 42 so that the stem is not deleteriously affected by the heat. Moreover, the heat is concentrated around the vulcanizing area so as to effect rapid vulcanization at a minimum expenditure of time and current consumption.

Due to the longitudinal adjustment of the member 20 on the operating lever 13, the vulcanizing surface 21 or plate 45 will accommodate itself and conform to the surface of the work irrespective of its position on the lever 13, so that upon the application of downward pressure on the lever 13, the vulcanizing surface will uniformly engage the work to impart a yieldable pressure thereto during the vulcanizing operation. The member 20 is moved toward or away from the standard 12 according to the size and thickness of the work to be cured.

As the tiltable vulcanizing member 20 and the operating member 13 are both simultaneously and independently movable relative to each other, it will be seen that when the parts are moved to their clamping positions, the work will be firmly maintained in a fixed position, while the independent movement of the operating member relative to the vulcanizing member will provide means to compensate for any irregularities in the thickness of the work and thus insure a permanent, smooth, strong weld to the cured or repair part.

The standard 12 is offset relative to the base in order that the terminals 27 and 28 may be conveniently attached to a flexible plug connection for supplying current to the heating unit without the flexible connection interfering with either the vulcanizing member as the latter is moved into and out of its operative positions or the work.

In Figures 7, 8, 9 and 10 are shown an improved vulcanizing block or member which may be either fixed or movable and has associated therewith means for insuring the rapid and uniform transfer of heat generated by the heating element to the vulcanizing surface and to a thermostat which is set to control the flow of current to the heating element in response to the temperature of the vulcanizing surface. As shown the heated block 49 has a vulcanizing surface 50 and is provided with an annular recess 51 which is opened at its upper end to receive a heat conducting plate 52 of substantially the same configuration and size as the recess 51, and an electric heating unit 53 which may rest upon the plate 52. The plate 52 has a series of spaced depending pins 54 and 54' which engage the inner wall of the vulcanizing surface 50 so as to form an air chamber 55 between the opposed sides of the plate and the vulcanizing surface.

A thermostatic device 56 connected to the side 57 of the block is provided with the terminals 58 and 59 and also with an adjustable contact screw 60. A thermostatic bar 61 is positioned within an offset portion 62 of the recess 51 so as to be connected at one end to the terminal 58 and engage at its opposite end the screw 60. The heating unit 53 which may be similar in construction to the heating unit 24 has one end 63 secured to the terminal 59, while its other end 64 is connected to the screw 60.

An asbestos disc 64' is preferably surmounted on the heating unit 53, so that its upper surface lies substantially in the same plane as the top of the block 49. A metallic closure plate 65, secured to the top of the block by the bolts 66, maintains the parts firmly within the recess 51. An asbestos disc 67 is preferably interposed between the plate 65 and the block 49, so as to provide further means for insuring the heat being retained in the chamber 51 and being directed towards the vulcanizing surface 50. Extending medially upwardly from the plate 65 is a tubular member or stem 68 which, as shown, is connected at one end to the plate 65 by the rivets 69, but which manifestly may be integral therewith. The tubular member 68 adjacent its upper end is formed with elongated slots 70 through which extends the operating member 71 for raising and lowering the block 49 relative to the base 72 and the work 73 in a manner similar to the operation of the corresponding parts previously described. The slots 70 are of such a length as to permit a free circulation of air being conducted into the chamber 55. A coil spring 74 surrounds the tubular member 68 and is confined between the plate 65 and the operating arm 71 so as to furnish yieldable means for supporting the member 71. A metallic washer or plate 75 may be positioned between the arm 71 and the upper end of the spring 74 for facilitating the rocking movement of the tubular member 68 during the operation of the vulcanizer.

As will be observed from Figure 7, the series of spaced pins 54 are positioned adjacent the thermostatic bar 61 to insure the rapid conduction of the heat to the thermostat. The vulcanizing surface 50 is provided medially with a central opening 76 (Fig. 8) which registers with openings 77 in the plate 52, the asbestos discs 64' and 67 and the closure 65, so as to align with the tubular member 68 for receiving a rubber valve stem 78 and also to provide an air passage to permit the free circulation of the air when the parts are in their inoperative positions.

The wall of the opening 76 in the vulcanizing surface 50 is also arranged to receive means for releasably securing an auxiliary plate, such as shown in Figure 6, to the block when the device is used for patching tubes or curing other rubber articles.

Assuming that it is desired to secure the rubber valve stem 78 to a tire tube, the parts are moved to the position shown in Figure 8. The thermostat has previously been set so as to cut off the current when the temperature of the vulcanizing surface 50 reaches a predetermined degree. It will be seen that the heat generated by the heating unit 53 heats the plate 52 and the air in the chamber 55, so as to conduct the heat to the vulcanizing surface 50. The pins 54 and 54' throw off the heat into the chamber 55 and as the thermostatic bar 61 is positioned adjacent the pins 54 and between the vulcanizing surface 50 and the heating unit 53, so as to extend under the plate 55, the heated air, due to its uniform density, will more quickly and evenly conduct the heat to the vulcanizing surface 50 and the thermostat than would be effected if the heat was transferred solely through a metal conductor.

In comparing the improved vulcanizing block with the type shown in Figure 1, it has been found that, in the latter, assuming the thermostat is set to operate at a temperature of 300° F. for cutting off the flow of the current to the heating unit, the surface of the vulcanizer 50 would register from stored up heat a temperature as high as 340° F. in from one to two minutes and that when it cooled off to where the thermostat was adjusted, it would register as low as 250° F. This was due to the fact that the heat would not penetrate the air space quickly, but would follow the metal parts. By reason of the provision of air chamber 55 and the location of the thermostat bar in the chamber and below the heating unit, it will be seen that when the thermostat is set at 300° F., so as to be operated when the vulcanizing surface exceeds this temperature, the thermostat due to the uniform and even transmission of the heat, is more sensitive and responsive to temperature variations. Consequently the vulcanizing surface will not rise above 300° F. and when it cools off to the setting of the thermostat, it will register about 290° F., thus making a variance of only 10% as compared to as much as 60% in the other form of block. In other words, by reason of the improved block structure which may be associated either with a movable member as shown or may constitute a part of a fixed block, means are provided for insuring the thermostat being operated more quickly and uniformly than has heretofore been possible.

It is to be understood that the forms of the invention shown and described are merely illustrative of preferred embodiments and that such changes may be made as fall within the purview of one skilled in the art without departing from the spirit of the invention and the scope of the appended claims.

I claim:—

1. In a device for vulcanizing valve stems to tubes, a fixed base, a movable member associated with the base and having a vulcanizing surface provided with an opening for receiving the valve stem, an electric heating unit carried by said member and having an opening registering with the opening in said vulcanizing surface, said heating unit being disposed to concentrate the heat over a localized area of the vulcanizing surface immediately adjacent said openings, an operating lever pivotally connected to said base, and means connecting said member to said lever to effect a floating connection of the member and heating unit relative to the lever.

2. In a device for vulcanizing valve stems to tubes, a base, a movable heated member having a centrally disposed opening for receiving a valve stem, said movable member coacting with said base to firmly maintain the tube and valve stem in a fixed position during the vulcanizing operation, an operating member associated with the base, an auxiliary vulcanizing plate having yieldable means arranged to engage the wall in the opening of the movable member to detachably secure the auxiliary plate to the movable member, and means adjustably connecting the movable member to the operating member.

3. A vulcanizing device of the class described including a base, a movable block associated with the base and having a centrally disposed opening in the bottom thereof and a tubular stem registering with said opening, a vulcanizing member having yieldable means arranged to engage the wall of said tubular stem for detachably securing the vulcanizing member to said block, an electric heating unit carried by said block and positioned to heat said vulcanizing member, an operating lever pivotally connected to said base, and means connecting said block to said lever to provide a floating connection for the block and vulcanizing member with the lever.

4. In a vulcanizer, a heated block having an opened recessed portion and a vulcanizing surface, a heat conducting plate within said recessed portion, said plate having spaced pins engaging the vulcanizing surface and separating the plate therefrom to form an air chamber, an electric heating unit carried by said plate and positioned above the air chamber, and a thermostatic device connected to the heating unit for controlling the current thereto, said thermostatic device having a heat responsive bar extending within the air chamber and below the heating unit whereby the heat generated by the heating unit is rapidly and uniformly conducted to the vulcanizing surface and the thermostat to insure the quick operation of the thermostat in response to temperature variations of the vulcanizing surface.

5. In a vulcanizer, a heated block having an opened recessed portion and a vulcanizing surface, a heat conducting plate within said recessed portion and disposed substantially parallel to the vulcanizing surface, said plate having a series of spaced pins engaging the vulcanizing surface and separating the plate therefrom to form an air chamber, an electric heating unit carried by the plate and spaced from the air chamber, and a thermostatic device secured to one side of the block and connected to said heating unit for controlling the current thereto, said thermostatic device having a heat responsive bar extending within the air chamber between the plate and the vulcanizing surface, said air chamber acting as a heat conductor for transferring the heat generated by the heating element uniformly and quickly to the vulcanizing surface and to the thermostat to insure effective operation of the thermostat in response to temperature variations of the vulcanizing surface.

6. In a device for vulcanizing valve stems to tubes, a fixed base, a movable member having a vulcanizing surface provided with an opening for receiving a valve stem, an electric heating unit associated with said member, said member having a tubular portion extending upwardly therefrom and registering with the wall of said opening to receive the valve stem, said movable member coacting with the base to maintain the tube and valve stem firmly in a fixed position during the vulcanizing operation, said heating unit being disposed to concentrate the heat over a localized area of the vulcanizing surface immediately adjacent said opening, a lever pivotally connected to the base, and means operatively connecting the lever to said tubular portion for moving said member and heating unit relative to the base.

7. In a device for vulcanizing valve stems to tubes, a fixed base, a movable member having a vulcanizing surface provided with an opening for receiving a valve stem, an electric heating unit associated with said member, said member having a tubular portion extending upwardly therefrom and registering with the wall of said opening to receive the valve stem, said movable member coacting with the base to maintain the tube and valve stem firmly in a fixed position during the vulcanizing operation, said heating unit being disposed to concentrate the heat over a localized area of the vulcanizing surface immediately adjacent said opening, said base having a standard extending upwardly therefrom and offset relative to one end thereof, an operating lever pivotally connected to said standard and arranged to extend lengthwise of the base, said heating unit having terminals extending from the side of the movable member adjacent the standard for receiving a flexible electric connection and disposed so as not to interfere with the work or the movement of said member, and means connecting said tubular portion to said lever to provide a floating connection of the movable member and heating unit with said lever.

8. In a device for vulcanizing rubber valve stems to tubes, a base for supporting the tube and valve stem, a movable member associated with the base and having a vulcanizing surface provided with an opening for receiving the valve stem, an electric heating unit associated with said member and disposed to concentrate the heat over a localized area of the vulcanizing surface immediately adjacent said opening whereby to connect effectively the valve stem to the tube during the vulcanizing operation, said member having an upwardly extending tubular portion registering with the wall of said opening and arranged to receive the valve stem, the overall thickness of said member and said heating unit relative to the valve stem being such that the valve stem sufficiently extends within the tubular portion to avoid excessive heating of the outer end of the valve stem, and means for moving said member and the heating unit relative to the base.

9. In a vulcanizer, a heated block having a recessed portion and a vulcanizing surface, a heat conducting plate within said recessed portion, said plate having spaced outwardly extending members engaging the vulcanizing surface and separating the plate therefrom to form an air chamber, and an electric heating unit positioned immediately adjacent said plate and spaced from said vulcanizing surface, whereby the heating unit initially heats the air in said chamber which in turn transmits its heat to the vulcanizing surface to insure the uniform and quick transmission of heat to the vulcanizing surface.

10. In a vulcanizer, a heated block having a recessed portion and a vulcanizing surface, a heat conducting plate within said recessed portion, said plate having spaced outwardly extending members engaging the vulcanizing surface and separating the plate therefrom to form an air chamber, and an electric heating unit positioned in contact with said plate and spaced from said vulcanizing surface, and a thermostatic device connected to the heating unit for controlling the current thereto, said thermostatic device having a heat responsive bar extending within the air chamber and below said heat conducting plate, whereby the heating unit initially heats the air in said chamber which in turn transmits its heat to the vulcanizing surface and the thermostat to insure the uniform and quick transmission of heat to these parts.

WILLIAM A. GWYNN.